UNITED STATES PATENT OFFICE.

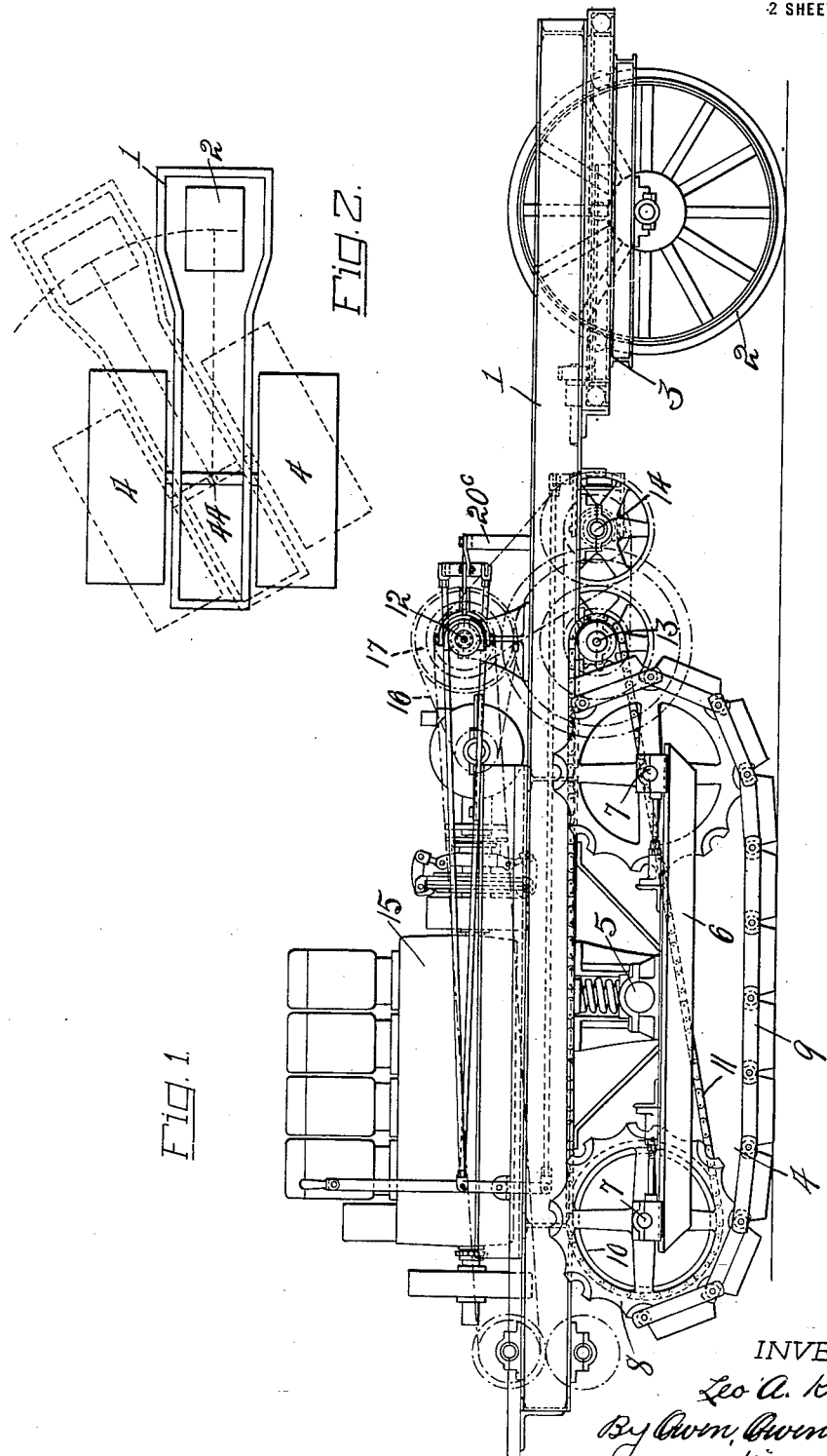

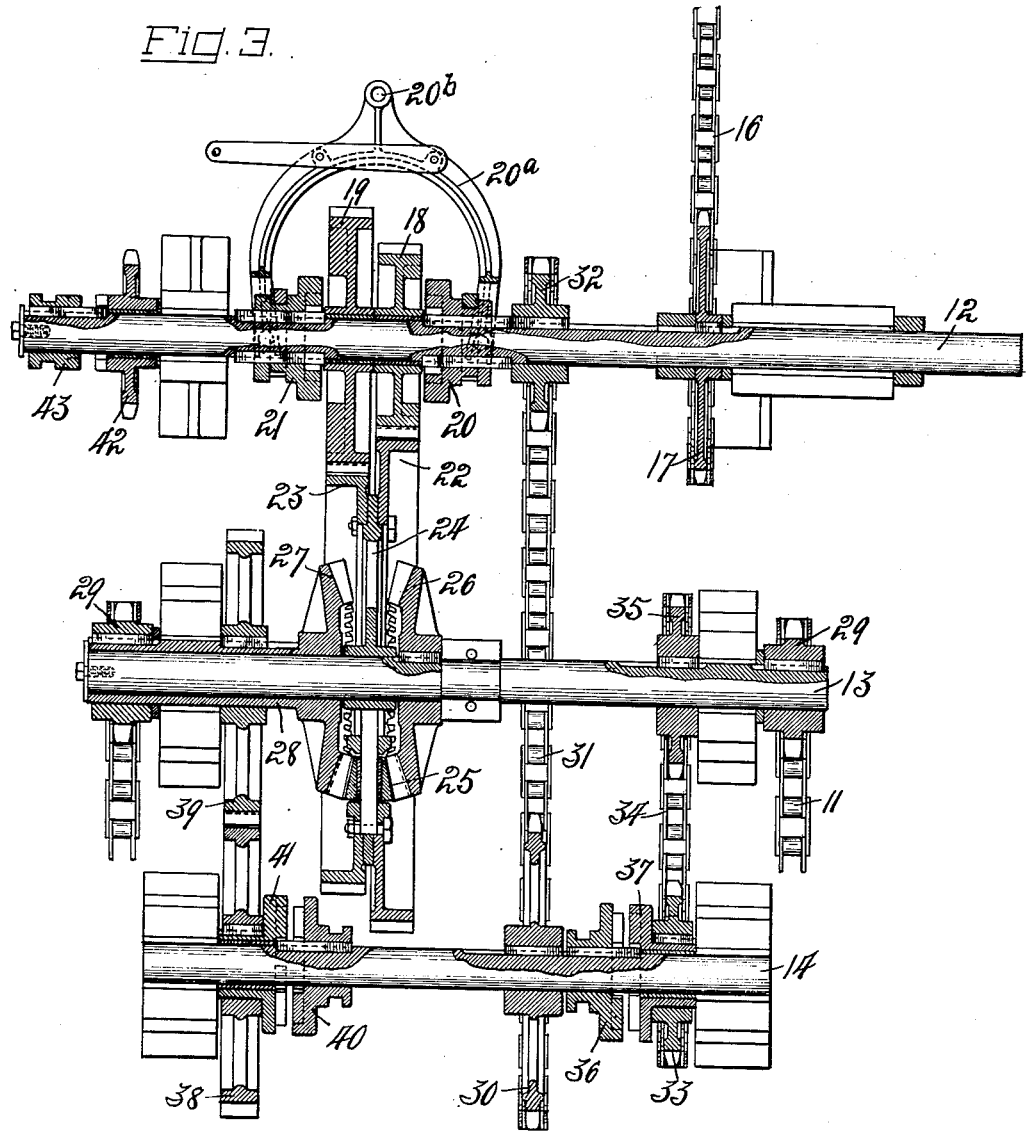

LEO A. KRUPP, OF FINDLAY, OHIO, ASSIGNOR TO THE BUCKEYE TRACTION DITCHER COMPANY, OF FINDLAY, OHIO, A CORPORATION OF OHIO.

POWER-TRANSMITTING MECHANISM FOR TRACTION UNITS.

1,196,119. Specification of Letters Patent. Patented Aug. 29, 1916.

Application filed November 1, 1915. Serial No. 59,033.

*To all whom it may concern:*

Be it known that I, LEO A. KRUPP, a citizen of the United States, and a resident of Findlay, in the county of Hancock and State of Ohio, have invented a certain new and useful Power-Transmitting Mechanism for Traction Units; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to traction and ditching machines of the apron wheel tractor type, and especially to the power transmission mechanism thereof. In the use of machines of this character considerable difficulty has been encountered by reason of the very large space required within which to turn, especially when operating in soft or marshy soil, and the object of my invention is to overcome such difficulties and objections by the provision of simple and efficient mechanism for enabling the machine to be turned within a circle having a radius which is less than the length of the machine.

The invention is fully described in the following specification, and while, in its broader aspect, it is capable of embodiment in numerous forms, a preferred embodiment thereof is illustrated in the accompanying drawings, in which—

Figure 1 is a side elevation of the tractor portion of a machine embodying my invention with parts removed. Fig. 2 is a diagrammatical plan thereof illustrating in dotted lines the narrow space within which the machine may turn, and Fig. 3 is a plan view of the power transmitting mechanism embodying the invention, with the several shafts arranged in a common plane.

Referring to the drawings, 1 designates the frame of the tractor portion of a machine embodying the invention, said frame being carried at its forward end by a single caster or steering wheel 2, which is mounted within a turntable 3 that is in turn mounted for turning movements in the forward portion of the frame, as is customary in traction or other machines of this character. The rear end of the frame 1 is supported by a pair of tractor units 4 of the apron wheel type, one of which is disposed at each side of the frame and is carried by the respective end of an axle 5. These apron wheels may be of any suitable construction and each is shown, in the present instance, as comprising a frame 6, which is journaled centrally of its ends for vertical rocking movements on the respective end of the axle 5 and carries a transverse shaft 7 at each end thereof on which are mounted sprocket wheels 8, which guide the movements of a tractor apron 9, as is well understood in the art. On one of the shafts 7, the rear one in the present instance, of each apron wheel, is mounted a sprocket wheel 10 to which power is transmitted by the drive chain 11, as hereinafter described. It will be understood that the tractor units may be of any suitable construction.

The power transmitting mechanism, in which resides the feature of my present invention, comprises, in the present instance, three shafts 12, 13 and 14, which are disposed transversely of the frame 1 and journaled at their ends in suitable bearings provided therefor in said frame. In the arrangement of these shafts as shown in Fig. 1, the shaft 12 is disposed over the shaft 13 and the shaft 14 is disposed in advance of the shaft 13 in substantially the horizontal plane thereof. This arrangement, however, may be varied to suit the convenience of assembly.

The shaft 12 is driven from the motor 15 by a sprocket chain 16 leading from a suitable drive member of the motor to a sprocket wheel 17 on said shaft. Mounted to turn loosely on the shaft 12 are a pair of spur gears 18 and 19 arranged side by side and having clutch surfaces at their outer sides with which respective clutch members 20 and 21, that are feathered to the shaft 12, may engage. The shifting movements of the clutch members 20 and 21 are controlled by the rocking movements of a yoke 20ª which is pivoted, as at 20ᵇ, to a convenient part of the machine frame, as, for instance, the part 20ᶜ in Fig. 1, and the arms of this yoke engage the respective clutch members 20 and 21, whereby a rocking movement of the yoke in one direction will move one of the clutch members 20, 21 into and the other out of engagement with its respective gear, and vice versa.

The shaft 13 carries a differential gearing 110 comprising the driven gears 22 and 23 of suitable size for meshing with and being driven by the respective gears 18 and 19 on the shaft 12, said gears 22 and 23 being mounted on a common spider 24, which carries a set of differential or compensating pinions 25 in mesh with the oppositely disposed bevel-gears 26 and 27. The bevel-gear 26 is keyed to the shaft 13, while the bevel-gear 27 is loose on said shaft and has a sleeve 28 extending outward from its hub through the adjacent frame bearing.

29, 29 designate the two sprocket wheels which engage and drive the respective sprocket chains 11 of the apron wheels, one of said sprocket wheels being keyed to the shaft 13 and the other being keyed to the sleeve 28.

The shaft 14 has a sprocket-wheel 30 keyed thereto and connected by a drive-chain 31 to a drive sprocket-wheel 32 on the shaft 12. A sprocket-wheel 33 is mounted loose on the shaft 14 and is in driving connection through a sprocket-chain 34 with a sprocket-wheel 35 that is keyed to the shaft 13. A clutch member 36 is feathered on the shaft 14 for shifting movements into and out of driving engagement with a companion clutch member 37 on the sprocket wheel 33. The shaft 14 also loosely carries one of a train of spur gears 38, 39, the latter of said gears being keyed to the sleeve 28 on the shaft 13. A clutch member 40 is shiftably mounted on the shaft 14 and movable into or out of engagement with a companion clutch member 41 on the gear 38.

42 designates a sprocket-wheel, which is loosely mounted on the shaft 12 and is intended to have driving connection with the excavating or pulverizer wheel of the machine (not shown). A clutch member 43 is feathered to the shaft 12 and is shiftable into or out of driving engagement with the sprocket wheel 42.

The operation of the mechanism is as follows: For straight ahead driving of the machine the yoke 20ª is shifted to place the desired clutch members 20, 21 into driving engagement with the respective gear 18, 19 depending on the speed at which it may be desired to drive the machine. The driving action of either gear 18, 19 causes a rotation of the gears 22, 23, spider 24, differential pinions 25 and bevel gears 26 and 27, said differential gearing and the shaft 13 and sleeve 28 turning as a unit, so that like driving action is imparted to the apron wheel driving sprockets 29, 29. During such straight ahead driving the shaft 14 is continuously driven from the shaft 12 due to the sprocket wheel and chain connection 30, 31 and 32 therebetween. If it is desired to turn the machine around, the clutch members 20, 21 are thrown to neutral position with respect to the gears 18, 19, thus permitting an idling of the differential gearing, and the clutches 36 and 40 are both thrown into engagement with the respective clutch members 37, 41, thereby communicating rotation to the shaft 13 in one direction from the shaft 14 through the sprocket wheel and chain connection 33, 34, 35, and imparting rotation in a reverse direction to the sleeve 28 from the shaft 14 through the gears 38 and 39. It is evident that the reverse driving of the shaft section 13 and sleeve 28 will cause a like reverse driving of the apron wheels and effect a consequent turning of the machine about the point 44 as a center, the steering wheel 2 having first been placed at right angles to the machine frame or crosswise thereof as shown by dotted lines in Fig. 2.

It is evident that I have provided a simple and efficient power transmitting mechanism which is operable to drive the traction wheels in the same direction at the same speed for straight ahead movements, or to drive the traction wheels in reverse directions at the same speed in turning; and also that the shiftable members of the different clutches may be controlled from any convenient position on the machine by any suitable mechanism, as is apparent. As the means employed for shifting the clutch members forms no part of the present invention, the same will not be specifically described.

I wish it understood that my invention is not limited to any specific construction, arrangement or form of the parts, as it is capable of numerous modifications without departing from the spirit of the claims.

Having thus described my invention, what I claim as new and desire to secure by Letters Patent, is,—

1. In a machine of the class described, the combination with means having tractor units disposed in transversely spaced relation, and a motor, of a shaft, a differential gearing mounted thereon and having a member fixed to the shaft and a member loose thereon and provided with a hub extension, driving connection between said shaft and one of said tractor units, driving connection between said hub extension and the other of said units, and mechanism operable to drive said differential gearing and shaft as a unit and also to impart reverse driving movements in unison to said shaft and hub extension from said motor.

2. In a machine of the class described, the combination with means having tractor units at opposite sides of the machine, and a motor, of a shaft having a differential gearing mounted thereon, with one beveled gear of said gearing fixed to the shaft and the other beveled gear loosely mounted on the shaft and provided with a hub extension, driving connection between said shaft and one of said tractor units, driving connection between said hub extension and the other of said tractor units, and mechanism operable to drive said differential gearing and shaft as a unit, and also to impart reverse driving movements to said shaft and hub extension from said motor.

3. In a machine of the class described, the combination with a pair of tractor units disposed in transversely spaced relation, and a motor, of a shaft, a differential gearing mounted on said shaft and having one beveled gear fixed to the shaft and the other beveled gear loose on the shaft and provided with a hub extension, separate driving means connecting said shaft and said hub extension with respective tractor units, and mechanism for communicating power from said motor at one speed to said shaft and hub extension through said differential gearing and for communicating power in reverse directions to said shaft and hub extension.

4. In a machine of the class described, the combination with a pair of tractor units arranged in transversely spaced relation, and a motor, of a main shaft having driving connection with said motor, a second shaft, a differential unit mounted on said second shaft and having one bevel gear keyed to the shaft and another bevel gear loose on the shaft and provided with an extended hub sleeve, clutch controlled means for driving said differential unit from said main shaft, a third shaft, driving connection between said main and third shafts and independent clutch controlled connection between said third shaft and said second shaft and hub sleeve for driving the second shaft and hub sleeve in reverse directions when the differential gearing is disconnected from said main shaft.

5. In a machine of the class described, the combination with a pair of transversely spaced tractor units of apron wheel type, and a motor, of mechanism intermediate said motor and tractor units to communicate like or reverse driving movements to the tractor units from a continuous rotation in one direction of the motor, said mechanism having first, second and third shafts, means for communicating rotation to the first shaft from said motor, clutch controlled means embodying a differential gearing for communicating rotation from the first to the second shaft, separate means connecting the differential bevel gears in said differential gearing to the different tractor units, and clutch controlled means driven from said first shaft and in connection with the differential bevel gears of said differential gearing for driving said gears in reverse direction when the differential gearing is disconnected from direct driving connection with said first shaft.

6. In a machine of the class described, a frame, a pair of transversely spaced tractor units carrying said frame, a motor mounted on the frame, a shaft, a differential gearing mounted on said shaft and having a member keyed to said shaft and a member loose on the shaft and provided with an extended hub sleeve, driving connection between said shaft and one of said tractor units, driving connection between said sleeve and the other of said tractor units, clutch controlled mechanism for driving said differential gearing from said motor, and means driven by said motor through a part of said mechanism and having clutch controlled reverse driving connection with said shaft and sleeve whereby simultaneous reverse driving movements may be communicated thereto from said motor when the differential gearing is disconnected from said driving mechanism.

In testimony whereof, I have hereunto signed my name to this specification.

LEO A. KRUPP.